(12) United States Patent
Jeffers et al.

(10) Patent No.: US 7,305,158 B2
(45) Date of Patent: Dec. 4, 2007

(54) INTERFEROMETRIC SIGNAL CONDITIONER FOR MEASUREMENT OF ABSOLUTE STATIC DISPLACEMENTS AND DYNAMIC DISPLACEMENTS OF A FABRY-PEROT INTERFEROMETER

(75) Inventors: Larry A. Jeffers, Minerva, OH (US); John W. Berthold, Salem, OH (US); Richard L. Lopushansky, The Woodland, TX (US); David B. Needham, Magnolia, TX (US)

(73) Assignee: Davidson Instruments Inc., The Woodlands, TX (US)

( * ) Notice: Subject to any disclaimer, the term of this patent is extended or adjusted under 35 U.S.C. 154(b) by 0 days.

(21) Appl. No.: 11/048,521

(22) Filed: Feb. 1, 2005

(65) Prior Publication Data
US 2005/0244096 A1    Nov. 3, 2005

Related U.S. Application Data

(60) Provisional application No. 60/562,429, filed on Apr. 15, 2004, provisional application No. 60/562,599, filed on Apr. 15, 2004, provisional application No. 60/562,600, filed on Apr. 15, 2004, provisional application No. 60/562,647, filed on Apr. 15, 2004.

(51) Int. Cl.
G02B 6/12 (2006.01)
G02B 6/26 (2006.01)
G01B 9/02 (2006.01)

(52) U.S. Cl. .......................... 385/15; 385/14; 356/477; 356/480

(58) Field of Classification Search ................ 356/477, 356/480; 385/15, 14
See application file for complete search history.

(56) References Cited

U.S. PATENT DOCUMENTS

| 3,923,400 A | 12/1975 | Hardy |
| 4,210,029 A | 7/1980 | Porter |
| 4,329,058 A | 5/1982 | James et al. |
| 4,418,981 A | 12/1983 | Stowe |

(Continued)

FOREIGN PATENT DOCUMENTS

| EP | 0957345 | 11/2002 |
| WO | WO99/15858 | 4/1999 |

OTHER PUBLICATIONS

R.L. Johnson, et al. "Miniature Instrument for the Measurment of Gap Thickness using Ply-chromatic Interferometry", Center for Astronomical Adaptive Optics, Steward Observ., U of AZ, Tucson.

*Primary Examiner*—Michelle Connelly-Cushwa
*Assistant Examiner*—Rhonda S. Peace
(74) *Attorney, Agent, or Firm*—McDonald Hopkins LLC; Robert H. Earp, III

(57) ABSTRACT

A signal conditioner to measure the length of an interferometric gap in a Fabry-Perot sensor (interferometer). The invention includes a light source, a Fabry-Perot interferometer capable of spanning a range of gaps in response to physical changes in the environment, a second interferometer that is placed in series with the Fabry-Perot interferometer which does not filter any particular wavelengths of light but acts as an optical cross-correlator, a detector for converting the correlated light signal into electronic signals, and an electronic processor which controls system elements and generates a signal indicative of the length of the gap spanned by the Fabry-Perot sensor.

26 Claims, 9 Drawing Sheets

U.S. PATENT DOCUMENTS

| | | |
|---|---|---|
| 4,572,669 A | 2/1986 | James et al. |
| 4,583,228 A | 4/1986 | Brown et al. |
| 4,596,466 A * | 6/1986 | Ulrich .................. 356/497 |
| 4,606,638 A | 8/1986 | Sommargren |
| 4,628,211 A | 12/1986 | Ruppert |
| 4,640,616 A | 2/1987 | Michalik |
| 4,647,203 A | 3/1987 | Jones et al. |
| 4,678,909 A | 7/1987 | Jackson et al. |
| 4,777,358 A | 10/1988 | Nelson |
| 4,787,741 A | 11/1988 | Udd et al. |
| 4,806,016 A | 2/1989 | Corpron et al. |
| 4,844,616 A | 7/1989 | Kulkarni et al. |
| 4,907,035 A | 3/1990 | Galburt et al. |
| 4,914,666 A | 4/1990 | Glance |
| 4,968,144 A | 11/1990 | Thomas et al. |
| 4,972,077 A | 11/1990 | Willson et al. |
| 4,995,697 A | 2/1991 | Adamovsky |
| 5,034,603 A | 7/1991 | Wilson |
| 5,094,534 A | 3/1992 | Cole et al. |
| 5,177,805 A | 1/1993 | Groger et al. |
| 5,187,546 A | 2/1993 | Johnston |
| 5,202,939 A | 4/1993 | Belleville et al. |
| 5,218,418 A | 6/1993 | Layton |
| 5,225,888 A | 7/1993 | Selwyn et al. |
| 5,239,400 A | 8/1993 | Liu |
| 5,276,501 A | 1/1994 | McClintock et al. |
| 5,283,625 A | 2/1994 | Bunn, Jr. |
| 5,351,317 A | 9/1994 | Weber |
| 5,361,130 A | 11/1994 | Kersey et al. |
| 5,392,117 A | 2/1995 | Belleville et al. |
| 5,401,956 A | 3/1995 | Dunphy et al. |
| 5,401,958 A | 3/1995 | Berkcan |
| 5,444,724 A | 8/1995 | Goto |
| 5,451,772 A | 9/1995 | Narendran |
| 5,473,428 A | 12/1995 | Lee et al. |
| 5,477,323 A | 12/1995 | Andrews et al. |
| 5,509,023 A | 4/1996 | Glance et al. |
| 5,526,114 A | 6/1996 | Eselun |
| 5,557,406 A | 9/1996 | Taylor et al. |
| 5,631,736 A | 5/1997 | Thiel et al. |
| 5,646,762 A | 7/1997 | Delavaux et al. |
| 5,647,030 A | 7/1997 | Jorgenson et al. |
| 5,682,237 A | 10/1997 | Belk |
| 5,760,391 A | 6/1998 | Narendran |
| 5,784,507 A | 7/1998 | Holm-Kennedy et al. |
| 5,818,586 A | 10/1998 | Lehto et al. |
| 5,835,214 A * | 11/1998 | Cabib et al. .................. 356/452 |
| 5,835,645 A | 11/1998 | Jorgenson et al. |
| 5,847,828 A | 12/1998 | Downs |
| 5,852,498 A | 12/1998 | Youvan et al. |
| 5,872,628 A | 2/1999 | Erskine |
| 5,910,840 A | 6/1999 | Furstenau |
| 5,923,030 A | 7/1999 | Assard et al. |
| 5,929,990 A | 7/1999 | Hall |
| 5,949,801 A | 9/1999 | Tayebati |
| 5,986,749 A | 11/1999 | Wu et al. |
| 5,999,261 A | 12/1999 | Pressesky et al. |
| 6,020,963 A | 2/2000 | DiMarzio |
| 6,069,686 A | 5/2000 | Wang et al. |
| 6,075,613 A | 6/2000 | Schermer et al. |
| 6,078,706 A | 6/2000 | Nau et al. |
| 6,088,144 A | 7/2000 | Doerr |
| 6,118,534 A | 9/2000 | Miller |
| 6,122,415 A | 9/2000 | Blake |
| 6,157,025 A | 12/2000 | Katagiri et al. |
| 6,173,091 B1 | 1/2001 | Reich |
| 6,178,001 B1 | 1/2001 | Kim |
| 6,233,262 B1 | 5/2001 | Mesh et al. |
| 6,281,976 B1 | 8/2001 | Taylor et al. |
| 6,282,215 B1 | 8/2001 | Zorabedian et al. |
| 6,289,143 B1 | 9/2001 | Berthold et al. |
| 6,304,686 B1 | 10/2001 | Yamate et al. |
| 6,330,255 B1 | 12/2001 | Hung |
| 6,396,605 B1 | 5/2002 | Heflinger et al. |
| 6,469,817 B1 | 10/2002 | Heflinger |
| 6,486,984 B1 | 11/2002 | Baney et al. |
| 6,490,038 B1 | 12/2002 | Jung et al. |
| 6,492,800 B1 | 12/2002 | Woods et al. |
| 6,496,265 B1 | 12/2002 | Duncan et al. |
| 6,501,551 B1 | 12/2002 | Tearney et al. |
| 6,538,748 B1 | 3/2003 | Tucker et al. |
| 6,539,136 B1 | 3/2003 | Dianov et al. |
| 6,545,760 B1 | 4/2003 | Froggatt et al. |
| 6,552,799 B1 | 4/2003 | Wright et al. |
| 6,563,968 B2 | 5/2003 | Davis et al. |
| 6,583,882 B2 | 6/2003 | Scruggs et al. |
| 6,597,458 B2 | 7/2003 | Tayag et al. |
| 6,608,685 B2 | 8/2003 | Wood et al. |
| 6,621,258 B2 | 9/2003 | Davidson et al. |
| 6,633,593 B2 | 10/2003 | Ksendzov et al. |
| 6,636,321 B2 | 10/2003 | Bohnert |
| 6,687,011 B1 | 2/2004 | Lee et al. |
| 6,714,566 B1 | 3/2004 | Coldren et al. |
| 6,717,965 B2 | 4/2004 | Hopkins, II et al. |
| 6,735,224 B2 | 5/2004 | Murry et al. |
| 6,741,357 B2 | 5/2004 | Wang et al. |
| 6,747,743 B2 | 6/2004 | Skinner et al. |
| 6,798,940 B2 | 9/2004 | Lee et al. |
| 6,806,961 B2 | 10/2004 | Hill |
| 6,822,979 B2 | 11/2004 | Daiber |
| 6,825,934 B2 | 11/2004 | Baney et al. |
| 6,829,259 B2 | 12/2004 | Pontis et al. |
| 6,839,131 B2 | 1/2005 | Kwon |
| 6,842,254 B2 * | 1/2005 | Van Neste et al. .......... 356/497 |
| 6,882,428 B2 | 4/2005 | Baney et al. |
| 2002/0015155 A1 | 2/2002 | Pechstedt et al. |
| 2002/0109081 A1 | 8/2002 | Tarvin et al. |
| 2002/0191294 A1 | 12/2002 | Duggan |
| 2003/0007522 A1 | 1/2003 | Li et al. |
| 2003/0020926 A1 | 1/2003 | Miron |
| 2003/0039428 A1 * | 2/2003 | Okamoto et al. ............. 385/12 |
| 2003/0053069 A1 | 3/2003 | Motamedi et al. |
| 2003/0072009 A1 | 4/2003 | Domash et al. |
| 2003/0076505 A1 | 4/2003 | Bao et al. |
| 2003/0128917 A1 | 7/2003 | Turpin et al. |
| 2003/0132375 A1 | 7/2003 | Blazo |
| 2003/0141440 A1 | 7/2003 | Kim et al. |
| 2003/0142702 A1 | 7/2003 | Pontis et al. |
| 2003/0147067 A1 | 8/2003 | Woodside et al. |
| 2003/0161360 A1 | 8/2003 | Johnson |
| 2003/0223073 A1 | 12/2003 | Van Wiggeren et al. |
| 2003/0231844 A1 | 12/2003 | Kersey et al. |
| 2004/0013356 A1 | 1/2004 | Wang et al. |
| 2004/0071383 A1 | 4/2004 | Balachandran et al. |
| 2004/0119981 A1 | 6/2004 | May |
| 2004/0136415 A1 | 7/2004 | Park et al. |
| 2004/0151216 A1 | 8/2004 | Tsai et al. |

* cited by examiner

INTERFEROMETRIC SIGNAL CONDITIONER FOR MEASUREMENT OF ABSOLUTE STATIC DISPLACEMENTS AND DYNAMIC DISPLACEMENTS OF A FABRY-PEROT INTERFEROMETER

The present invention relates to Fabry-Perot sensors and more particularly to a method and apparatus for enhanced processing of signals received from such sensors. This application claims the benefit of U.S. Ser. Nos. 60/562,429; 60/562,599; 60/562,600; and 60/562,647, all filed on Apr. 15, 2004.

BACKGROUND AND FIELD OF INVENTION

Fabry-Perot sensors have broad utility for applications which require monitoring of absolute, static displacements and small, dynamic vibrations or oscillating changes. For example, their simplicity of design allows these sensors to be embedded into industrial applications, including gas turbines, engines, pressure vessels, pipelines, buildings or other structures, in order to provide information about pressure, temperature, strain, vibration, or acceleration within the structure. Their size, durability, and fast response time make these sensors advantageous.

Fabry-Perot fiber optic sensor 5, shown in FIG. 1, is generally known in the art. A fiber optic Fabry-Perot sensor is an interferometric sensor. Light passes through optical fiber 10. The fiber 10 terminates at partially reflective surface 12a, which is itself aligned with partially reflective surface 12b. Surfaces 12a and 12b are separated by gap G, which changes due to vibrations or other movement of at least one of the surfaces 12a, 12b. Preferably, surface 12a is fixed while surface 12b is affixed to the object being monitored and may therefore move so as to change the size of the gap G. For example, surface 12b may be affixed to diaphragms, other fibers, cantilever beams or other such structures in order to monitor the aforementioned parameters.

In operation, light travels through fiber 10, and some of this light is reflected back into fiber 10 by surface 12a. Additional light is also reflected back into fiber 10 when it strikes surface 12b. The light reflected from the two surfaces (i.e., that which is transmitted back into fiber 10 via surfaces 12a and 12b) interferes to create an interference pattern, also called a modulation pattern. When the interference pattern is monitored over time for changes, these changes are indicative of changes in the length of the gap G and very small changes or oscillations may be detected with this type of sensor 5.

Such Fabry-Perot sensors must be used in conjunction with detection and processing equipment in order to provide quantitative feedback concerning changes in gap G over a given period of time. Notably, these arrangements provide for absolute or static measurements as well as relative or dynamic measurements of the oscillations or vibrations reflected by changes in the length of the gap G. The present invention contemplates inter alia an improved absolute static sensing and an improved relative dynamic sensing system and method, which incorporates a Fabry-Perot sensor in conjunction with enhanced detection and processing capabilities to improve the sensitivity, dynamic range, frequency response, cost, and operation of the system.

SUMMARY OF INVENTION

The invention, at its most basic level, consists of one or more light sources, a Fabry-Perot sensor spanning a gap to be monitored and means for optically cross-correlating the light reflected by the Fabry-Perot sensor. The cross-correlated light is, in turn, detected by one or more detectors, which convert the light signals into an electronic output. Finally, a processor uses the output to generate signal indicative of the length of the Fabry-Perot sensor gap. Additional means for positioning the optical cross-correlator(s) can be included to provide for a tunable system or to allow for the use of only one detector, although in the later case a microprocessor, rather than an analog circuit, might be necessary for the processor means contemplated by the invention.

The light sources may consist of a broadband light emitting diode (LED), edge light emitting diode (ELED), super luminescent diodes (SLEDs), wideband lasers such as a vertical cavity surface emitting laser (VCSEL), or various tungsten lamps.

The means for optical cross-correlation of the light reflected or transmitted by the Fabry-Perot interferometric sensor preferably comes in the form of one or more optical cross-correlators placed in parallel with one another and in series with the Fabry-Perot sensor. As used throughout, the term optical cross-correlator should be understood to mean a system element having a variable or fixed gap where the gap is bounded on either side by partial reflectors. Preferably, the reflectivity of these boundary surfaces is between 20% and 40%. These optical cross-correlators can be configured as Fabry-Perot interferometers or Fizeau interferometers. The amplitude or percentage of light reflected from or transmitted through the Fabry-Perot sensor and reflected from or transmitted through the optical cross-correlator is defined by the cross correlation product of the classic interferometric equation for each interferometer. For further discussion of such modulation, including the various equations that may be used to perform the calculations contemplated by this invention, refer to *Principles of Optics*, Chapter 7, Born and Wolf which is hereby incorporated by reference in its entirety (but with particular emphasis on Section 7.6.1, Equations 15a and 15b). This classic interferometric equation defines the intensity of light as a function of both the length of the gap in the interferometers and the spectral distribution of the light that is transmitted from the light source(s). Note that the optical cross-correlator contemplated by this invention does not filter or remove specific wavelengths from the light modulated (i.e., reflected or transmitted) by the Fabry-Perot sensor.

The optical cross-correlator itself may be a single Fizeau wedge (two reflectors separated by a linear variable gap) or a Fabry-Perot interferometer (by way of example rather than limitation and as discussed in greater detail below). The length of the gap in the optical cross-correlator may be fixed or variable by moving the Fizeau wedge or one or both of the reflectors in the Fabry-Perot cross-correlator using the aforementioned means for positioning, preferably a PZT or some other linear or rotary actuator, stepper motors, PZTs, magnetostrictive actuators, lever arms or any combination thereof.

The detectors may consist of silicon photodiodes, a silicon CCD array, InGaAs photodiodes, and/or an InGaAs CCD array. The detectors may view different light sources with different wavelength bands or the same light source through different optical cross-correlators. The detectors convert the light signals into an electronic output, and an electronic processor converts the electronic signals into representative measures of the Fabry-Perot sensor gap which correspond to the pressure, temperature, strain, vibration, or acceleration of interest. The electronic signals from the detectors may also be used to control the way in which the optical cross-correlator(s) are positioned.

Finally, the processing of the electronic signals from the photodetectors may be accomplished through the use of a digital microprocessor or in an analog electronic circuit. If the processing is performed by way of a microprocessor, software can be used to read the electronic signal and control the position of the optical cross-correlators and select the detector that provides the output signal indicative of the gap distance. In contrast, if the processing relies on an analog electronic switching circuit, this circuit may be controlled by a comparator which selects the stronger of the first and second signals in order to generate an output signal indicative of the gap distance.

BRIEF DESCRIPTION OF THE DRAWINGS

FIG. 2a is the preferred embodiment and is obtained using light sources with two different wavelength bands and one optical cross-correlator. FIG. 2b is an alternate embodiment and is obtained using a single light source with two optical cross-correlators that have slightly different interferometric gaps, i.e. a difference of approximately $\lambda/x$ (where $\lambda$ is the center wavelength of the light source and the preferred value for x is dependent upon the precise selection and configuration of system elements but, in all cases, x is greater than 4 and typically ranges between 5 and 10). For brevity, this condition is called "pseudo-quadrature" throughout this specification.

FIG. 3a is an optical schematic of the preferred embodiment and corresponds with the signal shown in FIG. 2a.

DESCRIPTION OF PREFERRED EMBODIMENTS

Figure 1:
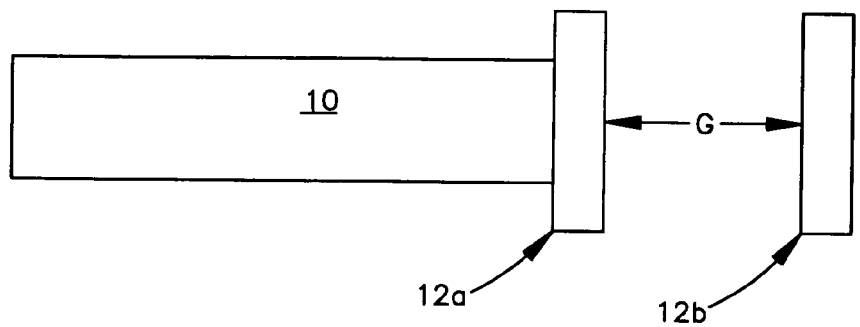
FIG. 1 is cross sectional view of a basic Fabry-Perot sensor known in the art.

The present invention is of a signal processor that measures the absolute length of a gap and dynamic changes in the length of a gap in a Fabry-Perot sensor (i.e., the length of gap G shown in FIG. 1). Specifically, the invention uses an optical cross-correlator in series with a Fabry-Perot sensor to generate a signal that is indicative of the length of the Fabry-Perot sensor gap.

Figure 2A:
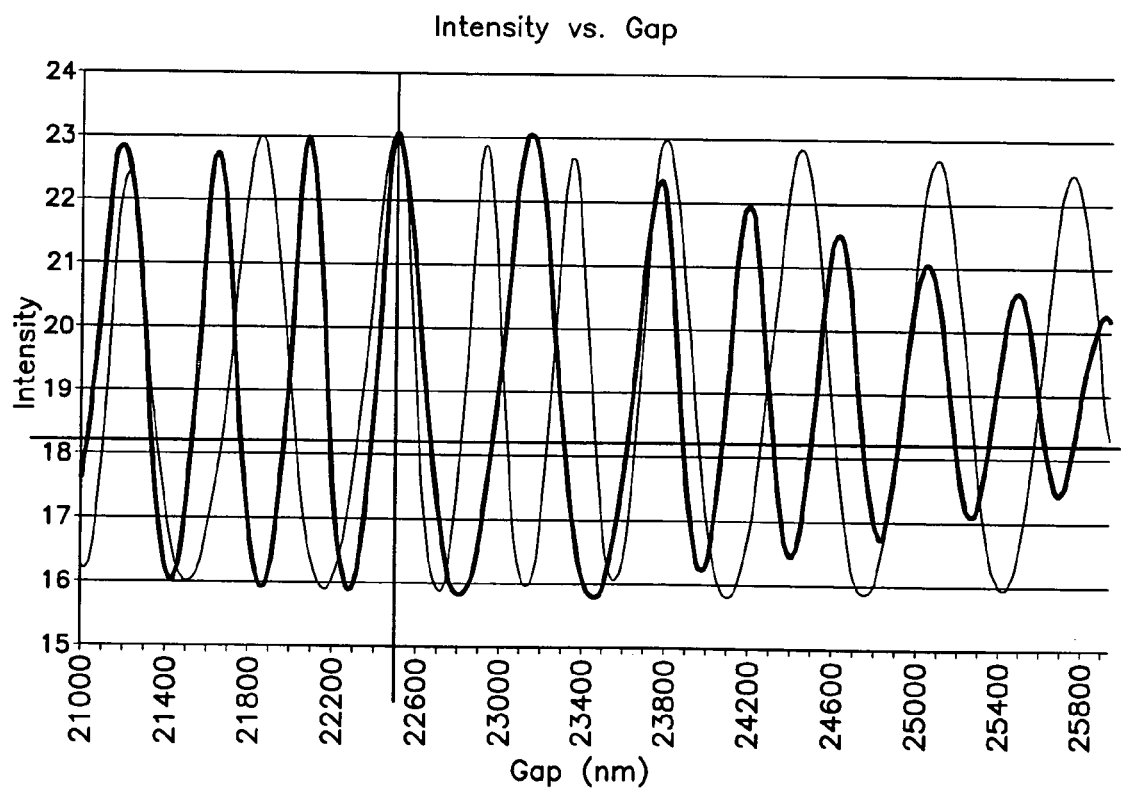
FIGS. 2a and 2b are general plots of the signal output of the present invention.
Figure 3A:
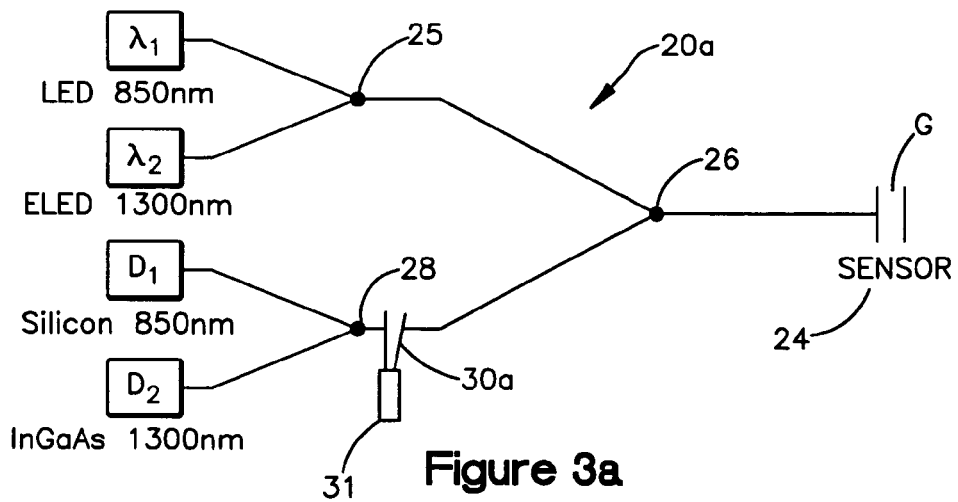

In the preferred embodiments of the inventive system 20 depicted in FIG. 3a, system 20 is designed to measure the length of a gap G of a Fabry-Perot sensor 24 using two different light sources, $\lambda_1$ and $\lambda_2$, a single optical cross-correlator with means for varying the length of the gap in the optical cross-correlators, and two different types of photodetectors. By way of illustration rather than limitation, system 20 contemplates the use of one LED with a center wavelength of 850 nm and a bandwidth of 50 nm and one ELED with a center wavelength of 1300 nm and a bandwidth of 50 nm. FIG. 2a shows a plot of modulated light signals received from the two detectors of the present invention where one signal is from the 850 nm LED and the other is from the 1300 nm ELED; where the length of the Fabry-Perot sensor gap is fixed at 22,500 nm; and where the length of the gap in the variable optical cross-correlator ranges from 21,000 nm to 25,800 nm. The absolute highest peak from each of the two separate signals coincide precisely where the length of the gap in the optical cross-correlator matches the length of the Fabry-Perot sensor gap, i.e. 22,500 nm. Calibration of the length of the gap in the optical cross-correlator provides an absolute measure of the length of the Fabry-Perot sensor gap. Dynamic changes in the length of the gap G due to vibrations or pressure pulsations are measured by positioning the variable gap optical cross-correlator so one signal is on the steep slope while the other signal is near its adjacent peak. The means and rationale for creating these separate signals is discussed in greater depth below. The use of a CCD array for one detector in lieu of a photodiode enables precise positioning of the variable gap optical cross-correlator and thus more accurate absolute measurements and allows very high frequency response through the second photodiode detector.

The invention restricts the Fabry-Perot sensor operation over an absolute displacement range equal to the range in possible beam path distances in the optical cross-correlator that are greater than the coherence length of the light sources. The invention restricts the Fabry-Perot sensor operation over a dynamic displacement range approximately 160 nm (+/−80 nm) based on the use of an 850 nm LED. The actual dynamic displacement limitation is a function of the center wavelength of the selected long wavelength light source and has a maximum dynamic amplitude of approximately $\lambda/x$, where $\lambda$ is the light wavelength and x is greater than 4 and more preferably about 5 in order to produce the preferred pseudo-quadrature state for this specific configuration. Analysis has determined that the 1300 nm ELED light source and the 850 nm LED light source provides acceptable performance at sensor to signal conditioner distance ranges exceeding 1000 and 2500 meters respectively and provides absolute measurements with resolution of 1:10,000 and has a frequency response exceeding 50 kHz. However, the invention is not limited to those light sources specifically identified for this embodiment, and other light sources with other wavelengths may be implemented depending upon the desired distance between the Fabry-Perot sensor, the absolute resolution, the frequency response, and the means for correlating the light from that sensor, compatibility with available detectors, the availability of components and/or other factors.

Specifically, the preferred embodiment consists of light from the two incoherent light sources $\lambda_1$ and $\lambda_2$ with emission bands preferably 50 nm wide centered at specific different wavelengths and are preferably coupled via multimode optical fiber to a 2×1 coupler 25 and delivered to Fabry-Perot sensor 24 through a second 2×1 coupler 26. The light transmitted to the sensor 24 is modulated by the Fabry-Perot sensor gap and reflected back through coupler 26 and through an optical cross-correlator 30a where it is further modulated and then divided at a third coupler 28 and passes onto detectors $D_1$ and $D_2$. Cross-correlator 30a is coupled to means for positioning 31 so that the beam-path distance of light reflected from sensor 24 can be controllably varied as it traverses through cross-correlator 30a.

Signals $S_1$ and $S_2$, are respectively associated with detectors $D_1$ and $D_2$. One detector, preferably the silicon detector may be a CCD array and the other is preferably an InGaAs photodiode. Note the use of two different types of detectors (silicon and InGaAs) and one visible (850 nm) and one infrared (1300 nm) light source eliminates the need for band pass filters since silicon detectors are insensitive to wavelengths near 1300 nm and InGaAs detectors are insensitive to wavelengths near 850 nm. In addition to high accuracy absolute measurements of static conditions (which can be readily calculated by those skilled in the art) and high frequency response of dynamic conditions, the use of two separate light sources in the same system allows switching from coarse to fine sensitivity for dynamic measurements. For coarse sensitivity, the maximum permissible Fabry-Perot sensor displacement range based on a 1300 nm source would be approximately +/−140 nm and for fine sensitivity the maximum permissible Fabry-Perot sensor range based on an 850 nm source would be limited to a narrower range of approximately +/−80 nm.

Ultimately, the parameters of design for the invention are dictated by the circumstances, including factors such as the environment or operating conditions of the sensor, source power, wavelength and spectral distribution of the sources, distance between the elements of the inventive system, anticipated displacements to be monitored, the absolute accuracy, resolution, and frequency response required in the application, and the cost of the components. Notably, ordinary LEDs used in combination with ELEDs are sufficient for the embodiment depicted in FIG. 3a, and higher cost super luminescence diodes (SLDs) are not required.

Figure 3B:
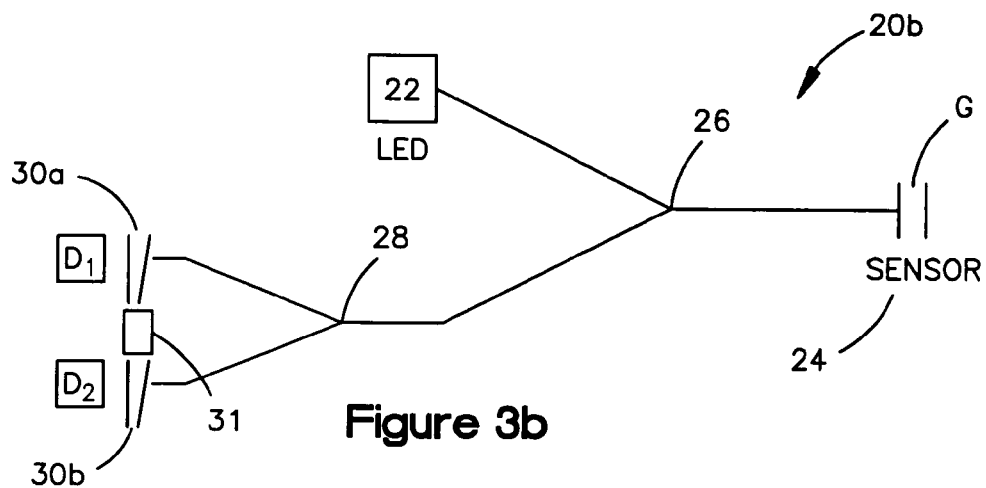
FIG. 3b is an optical schematic of one alternate embodiment that corresponds with the signal shown in FIG. 2b that allows the optical cross-correlators to be variably positioned.

In an alternate embodiment shown in FIG. 3b, system 20b is designed to measure the length of gap G of a Fabry-Perot sensor 24 using a single light source and two variable gap optical cross-correlators held in a fixed position relative to one another, and two detectors. By way of illustration rather than limitation, system 20b contemplates the use of a single LED with a center wavelength of 850 nm and a bandwidth of 50 nm. Other light sources will be apparent based upon the nuances of the system, as discussed in greater detail below.

Figure 2B:
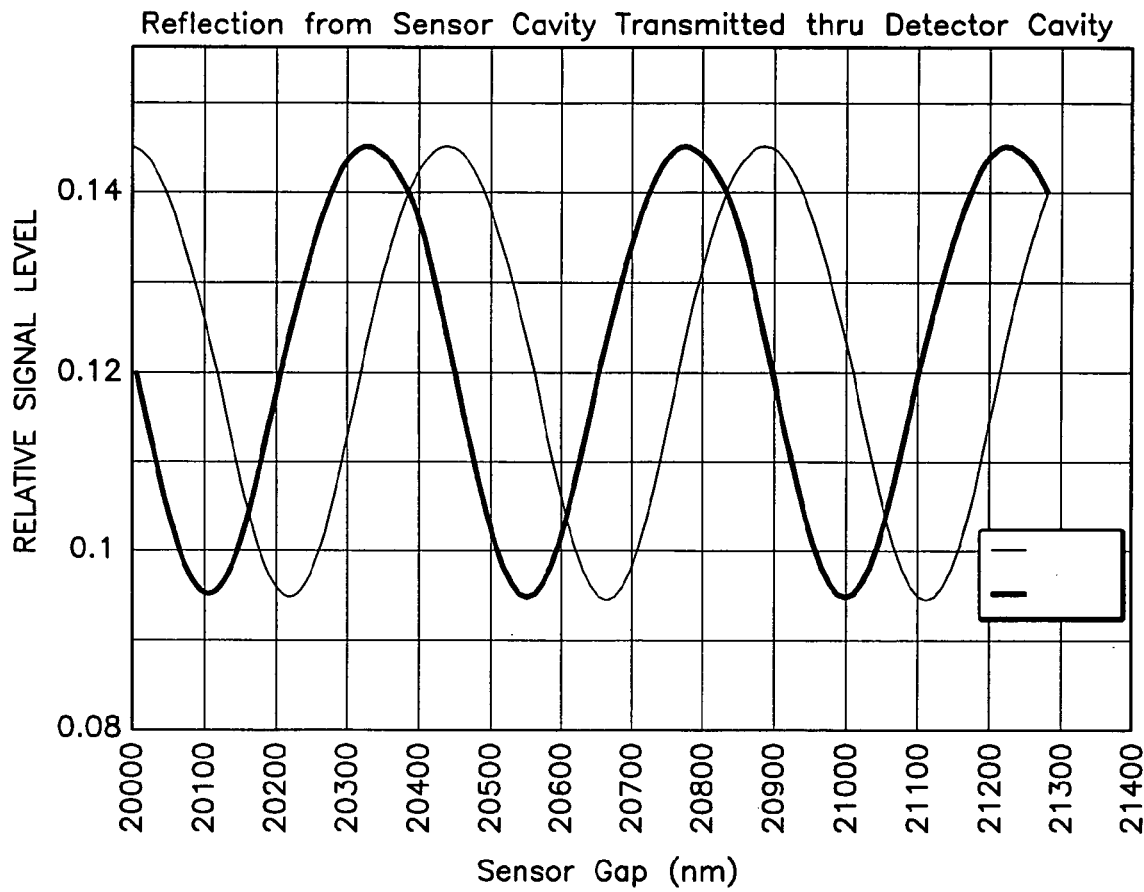

FIG. 2b shows a plot of modulated light signals received from the detectors of this alternate embodiment of the invention where both signals are from an 850 nm LED; where the length of the Fabry-Perot sensor gap ranges from 18,000 nm to 22,500 nm; and where the length of the gaps in the variable optical cross-correlators are fixed at 21,000 nm to 21,090 nm. The absolute highest peak from each of the two separate signals coincide precisely where the length of the gaps in each of the optical cross-correlators matches the length of the Fabry-Perot sensor gap, i.e. 21,000 nm and 21,090 nm respectively. Calibration of the length of the gap in one or both of the optical cross-correlators provides an absolute measure of the length of the Fabry-Perot sensor gap. Dynamic changes in the length of the gap G due to vibrations or pressure pulsations are measured by positioning one of the variable gap optical cross-correlators so its signal is on the steep slope while the signal from the other variable gap optical cross-correlator is at its peak.

Peaks from the two separate signals are effectively out of phase with one another because they pass through separate optical cross-correlators positioned to have differing beam-path distances for the reflected light from sensor 24. These beam-path distances can be controlled, in tandem or individually, by means for positioning 31. In a preferred embodiment, calibration of the length of the beam path distances in optical cross-correlators 30a, 30b can be controlled by a voltage applied to the PZT, stepper motor or other moving element in means for positioning 31, such that an absolute measure of the length of the Fabry-Perot sensor gap corresponds to that applied voltage although other methods of identifying the gap length are also contemplated. This control may be achieved via a microprocessor with appropriate software so that adjustments can be made to cross-correlators 30a, 30b in real time. Alternatively, if a more definite range of operation is anticipated or if the system requirements permit only periodic status checks, the adjustment of the cross-correlators 30a, 30b can be performed over a longer period of time, thereby allowing the use of an analog processor.

Dynamic displacements of the gap G can be measured by fixing the position of one of the variable gap optical cross-correlators relative to the other such that the fully modulated signals are out of phase with one another. This is accomplished by assuring the difference in the length of the gap between the two optical cross-correlators is approximately $\lambda/x$, where $\lambda$ is the light wavelength and x is greater than 4 and more preferably about 8 in order to produce the preferred pseudo-quadrature state for this specific configuration. This assures that one signal is on the steep part of its modulation curve while the other is at a peak or valley. The means and rationale for creating these separate signals is discussed in greater depth below.

The use of a CCD array for one detector in lieu of a photodiode enables precise positioning of the optical cross-correlators, thereby yielding more accurate measurements and allowing very high frequency response through the second photodiode detector. Nevertheless, any known detector which produces an adequate and compatible signal may be used in system 20b, or any of the other embodiments described herein.

System 20b restricts operation over an absolute displacement range equal to the range in possible gaps of the variable gap optical cross-correlators that exceed the coherence length of the light source, and restricts the Fabry-Perot sensor operation over a dynamic displacement range of approximately 160 nm (+/−80 nm). The actual dynamic displacement limitation is a function of the center wavelength of the selected light source and has a maximum dynamic peak-to-peak amplitude of approximately $\lambda/x$, where $\lambda$ is the light wavelength and x is greater than 4 and more preferably about 5 in order to produce the preferred pseudo-quadrature state for this specific configuration. Experimentation has determined that the LED light source 850 nm provides acceptable performance at distance ranges up to 1000 meters and ELED light source 1300 nm provides acceptable performance at sensor to signal conditioner distances ranges in excess of 2500 meters; frequency response to 5 kHz, and absolute resolution of 1:1000. Nevertheless, other light sources are possible, with particular applicability being envisioned for LEDs.

Turning to the elements shown in FIG. 3b, a visible or infrared incoherent light source 22 has an emission band preferably 50 nm wide and peak emission wavelength $\lambda$. Light is preferably delivered via multimode optical fiber to a Fabry-Perot sensor 24 through a 2×1 coupler 26. The light reflected from sensor 24 is modulated by the Fabry-Perot sensor gap. The light is divided at a second coupler 28 and passes through optical cross-correlators 30a, 30b (preferably, two Fizeau wedges) and projected onto detectors $D_1$ and $D_2$. Signals $S_1$ and $S_2$, are respectively associated with detectors $D_1$ and $D_2$. The detectors must be selected to match the emission spectrum of the light source (for example, silicon for a visible light source or InGaAs for an infrared light source). Means for positioning 31 controls cross-correlator 30a and/or 30b, either in real-time or on a periodic basis, to insure that system 20b returns viable results and remains within the operating parameters described above.

Figure 3C:
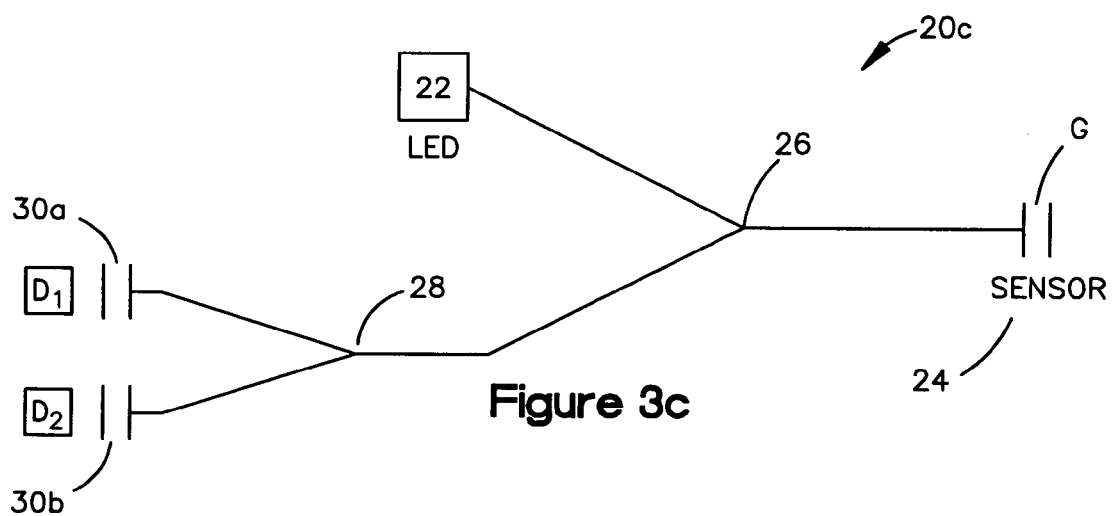
FIG. 3c is an optical schematic of one alternate embodiment that corresponds with the signal shown in FIG. 2b that employs two optical cross-correlators at fixed positions.

In yet another alternate embodiment depicted in FIG. 3c, system 20c is designed to measure the dynamic gap G of a Fabry-Perot sensor 24 using a single light source 22 with fixed optical cross-correlators 30a, 30b. By way of illustration rather than limitation, system 20c contemplates the use of a single LED with a center wavelength of 850 nm and a bandwidth of 50 nm. Other light sources will be apparent based upon the nuances of the system, as discussed in greater detail below. FIG. 2b also shows a plot of modulated light signals as received from the detector(s) in FIG. 3c. Both signals are from the 850 nm LED. Peaks from the two separate signals are out of phase with one another because they pass through separate optical cross-correlators with gaps that differ by approximately $\lambda/x$, where $\lambda$ is the light wavelength and x is greater than 4 and more preferably about 8 in order to produce the preferred pseudo-quadrature state for this specific configuration, thereby assuring that one signal is on the steep part of its modulation curve while the other is at a peak or valley.

System 20c restricts the Fabry-Perot sensor operation over an absolute displacement range equal approximately +/−2 um for light sources with 50 nm bandwidths and approximately +/−200 um for light sources with 5 nm bandwidth. The invention restricts the Fabry-Perot sensor operation over a dynamic displacement range of approximately 80 nm (+/−40 nm) for light sources with a center wavelength of 850 nm. The actual displacement limitation is a function of the center wavelength of the selected light source and has a maximum amplitude of approximately $\lambda/x$, where $\lambda$ is the light wavelength and x is greater than 4 and more preferably about 10 in order to produce the preferred pseudo-quadrature state for this specific configuration. Experimentation has determined that the LED light source 850 nm provides acceptable performance at distance ranges up to 1000 meters and ELED light source 1300 nm provides acceptable performance at sensor to signal conditioner distances ranges in excess of 2500 meters; frequency response to 5 kHz, and absolute resolution of 1:500.

Light is preferably delivered via multimode optical fiber to Fabry-Perot sensor 24 through a 2×1 coupler 26. The light reflected from sensor 24 is modulated by the Fabry-Perot sensor gap. The light is divided at a second coupler 28 and passes through two fixed optical cross-correlators 30a, 30b and projected onto detectors $D_1$ and $D_2$. Signals $S_1$ and $S_2$, are respectively associated with detectors $D_1$ and $D_2$. Again, the detectors must be selected to match the emission spectrum of the light source.

Figure 3D:
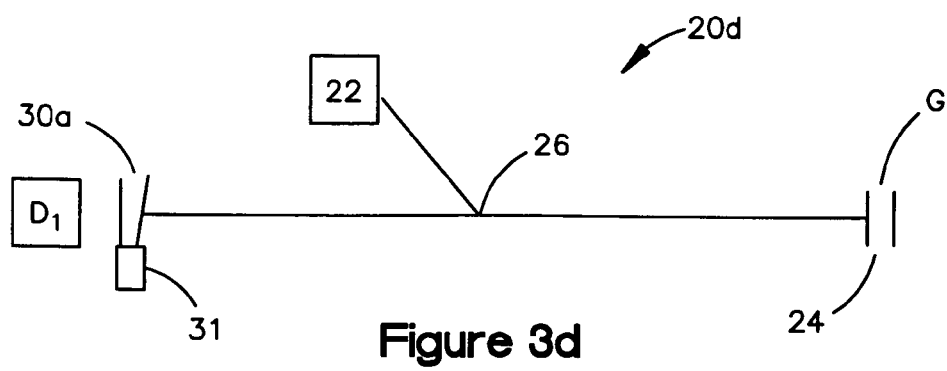
FIG. 3d an optical schematic of one alternate embodiment that utilizes a single optical cross-correlator and a single detector in combination with means for positioning.

Yet another embodiment depicted in FIG. 3d. Here, system 20d is designed to measure either the length of gap G of a Fabry-Perot sensor 24 using a single light source, optical cross-correlator, and positioning device. By way of illustration rather than limitation, system 20d contemplates the use of an LED with a center wavelength of 850 nm and a bandwidth of 50 nm. Other light sources will be apparent based upon the nuances of the system, as discussed in greater detail below. FIG. 2c shows a plot of modulated light signals received from the detector(s) of the present invention as configured in FIG. 3d.

Calibration of the position of the optical cross-correlator positioning device relative to the gap of the optical cross-correlator provides an absolute measure of the length of the Fabry-Perot sensor gap. Dynamic displacements of the gap G are measured by positioning the optical cross-correlator off of the peak so that the length of gap in the optical cross-correlator is approximately $\lambda/x$, where $\lambda$ is the light wavelength and x is greater than 4 and more preferably about 9 in order to produce the preferred pseudo-quadrature state for this specific configuration, greater than the length of the gap in the optical cross-correlator at its peak. This assures that the output signal is on the steep part of its modulation curve. This can be accomplished by dithering a very high speed positioning device such as a PZT or other linear actuator; or alternatively by projecting the light through the optical cross-correlator and onto a CCD array or other such array. This arrangement enables precise positioning of the length of the gap in the optical cross-correlator and more accurate measurements at a sacrifice to the frequency response of the system due to the slower response of the CCD array. Again, given the quick response time required for control of the positioning device and the optical cross-correlator, a microprocessor is envisioned as the preferred means to implement the invention.

System 20d restricts the Fabry-Perot sensor operation over an absolute displacement range equal to the range in possible gaps of the variable gap optical cross-correlator that exceed the coherence length of the light source, and restricts the Fabry-Perot sensor operation over a dynamic displacement range of approximately 160 nm (+/−80 nm) based on the use of an 850 nm LED. The actual displacement limitation is a function of the center wavelength of the selected light source and has a maximum amplitude of approximately $\lambda/x$, where $\lambda$ is the light wavelength and x is greater than 4 and more preferably about 5 in order to produce the preferred pseudo-quadrature state for this specific configuration. Experimentation has determined that the LED light source 850 nm provides acceptable performance at distance ranges up to 1000 meters and ELED light source 1300 nm provides acceptable performance at sensor to signal conditioner distances ranges in excess of 2500 meters.

A visible or infrared incoherent light source 22 has an emission band preferably 50 nm wide and peak emission wavelength λ. Light is preferably delivered via multimode optical fiber to Fabry-Perot sensor 24 through a 2×1 coupler 26. The light reflected from sensor 24 is modulated by the Fabry-Perot sensor gap. The light is cross-correlated via correlator 30a and projected onto detector $D_1$. The detectors must be selected to match the emission spectrum of the light source, i.e. silicon for a visible light source and InGaAs for an infrared light source. Positioning means 31 controls the cross-correlator 30a. Optionally, a second detector may be included (not shown) to enhance the speed and accuracy of the system. This detector is preferably arranged in a reflectance position relative to cross-correlator 30a, thereby requiring a proper optical connection thereto.

All embodiments of system 20a, 20b, 20c and 20d rely upon similar elements. Use of similar reference numerals for each embodiment indicates that such elements may be interchangeable and the pertinent features of each element may pertain equally to each embodiment even if a detailed discussion was not provided for each. Similarly, in the following description, general reference to specific elements or to system 20 is intended to be applicable for all of the embodiments described above. Finally, it should be understood that still other variations or further embodiments may be inherent to those skilled in the art relying upon the inventive principles described and claimed herein, and it is the express intention of the inventors that all such variations or further embodiments are contemplated herein.

Notwithstanding the elements depicted in FIGS. 3a, 3b, 3c and 3d, those skilled in the art will appreciate that the optical cross-correlator(s) and/or the Fabry-Perot sensor may be arranged to reflect or transmit light in any of the embodiments described above without departing from the inventive principle. In particular, the embodiments of FIGS. 3a and 3d are expected to have particular utility when the cross-correlator allows for reflectance of the modulated light. By the same token, the sensor itself could also be constructed to permit transmission, rather than reflectance, of the modulated light.

The preferred and alternate embodiments of the present invention use either a digital microprocessor (most preferably for systems 20a, 20b and 20d) or an analog electronic circuit (preferably for system 20c) in order to provide the user with measurements of either the Fabry-Perot sensor gap which can be used to derive the resulting engineering units which may be pressure, temperature, strain, vibration, acceleration, etc. The major components of the digital microprocessor based system are the microprocessor, software, analog to digital data converters, detector amplifiers, optical cross-correlator and its means for varying the length of the gap in the cross-correlator, and power supply. The processor itself must be operatively associated with the detector and, where appropriate, the means for positioning although it may be integrated into either of these systems in manner well-known in the electronic arts.

Figure 4A:
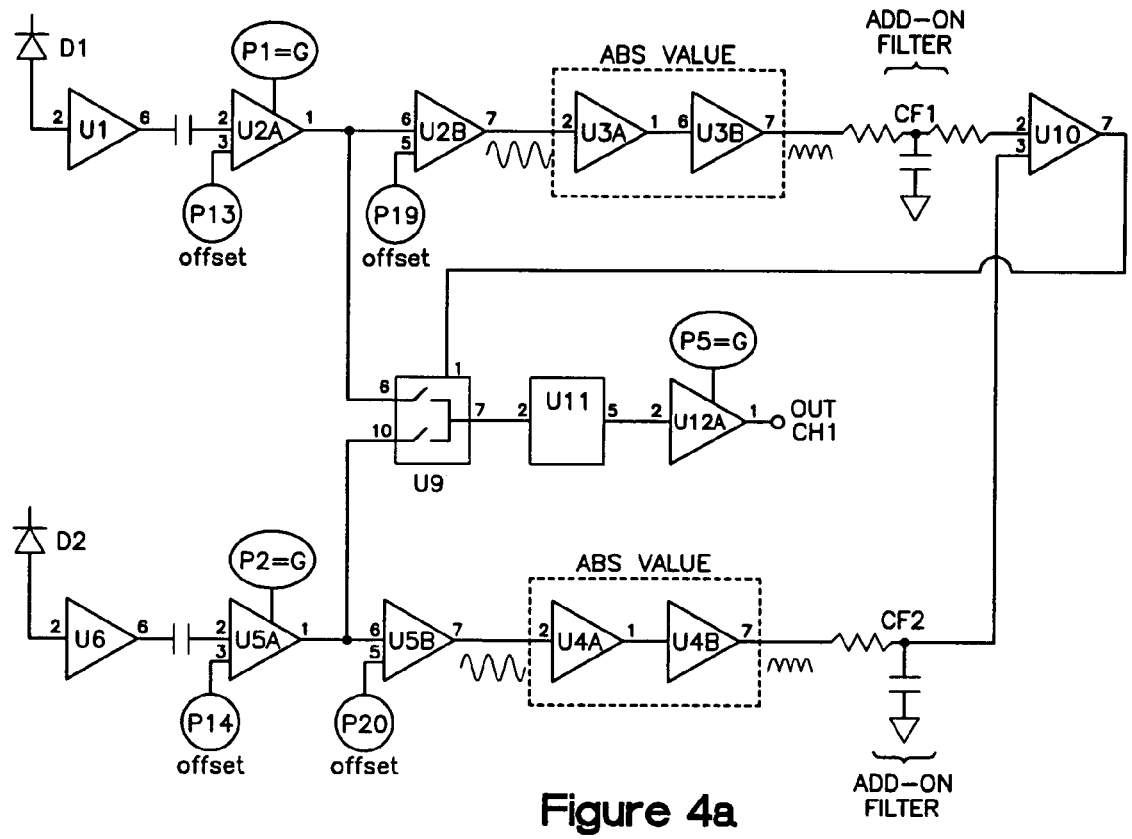
FIG. 4a shows a possible circuit for the comparator operation required by the signal processor of the present invention.

The major components of the analog electronic processor are shown in FIG. 4a. In both cases, all components may be purchased from commercially available electronics suppliers, so as to minimize cost and ease of construction. In both the digital and analog versions, inputs from the one or two detectors (e.g. $D_1$ and $D_2$) are amplified by transimpedance amplifiers U1 and U6. In the digital version, further signal processing is done in the microprocessor. In the analog version, the outputs of U1 and U6 are amplified again by first stage amplifiers U2A and U5A and the outputs from U2A and U5A each travel on dual paths. The first path goes to the second stage amplifier, through an absolute value amplifier, through a filter, to a comparator U10 and to the signal selection switch U9. The output of the comparator controls the signal selection switch U9. After the signal passes through the switch, it goes through a low pass amplifier U11 and then through a calibration amplifier to the final output.

Figure 4B:
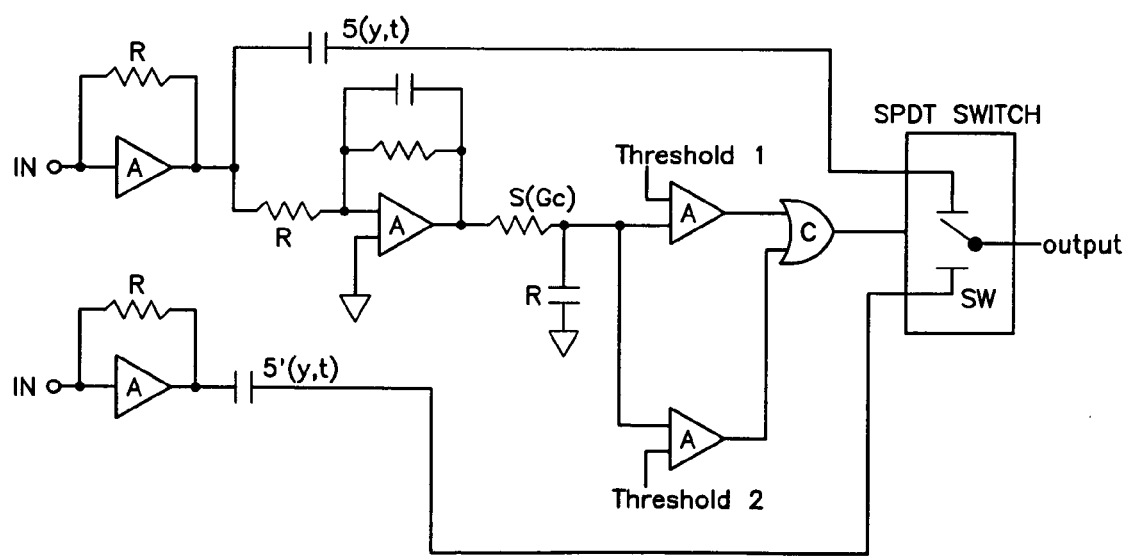
FIG. 4b shows a possible circuit needed to switch signal selection in the signal processor of the present invention.

Because of the "pseudo-quadrature" condition of the two detector signals the signal on the high side of CF1 reaches a maximum value when the signal on CF2 is a minimum and vice versa as the static gap continues to change. When the two signals crossover, the comparator switches the output from S1 to S2. Another possible configuration for the switching circuit is depicted in FIG. 4b, although those skilled in the art will be able to devise other switching schemes which meet the fast response time and simplicity of design preferred in the present invention. With respect to the elements of FIG. 4b, a series of amplifiers A are configured with resistors R, switch SW and comparator C as illustrated.

With reference to FIG. 2b, it can be seen that, in order to avoid whichever signal is near the low sensitivity region near the positive and negative peaks of the quasi-sine wave where the signal changes very little with changes in sensor gap, it is necessary to chose either S1 or S2 depending on which is in the quasi-linear response region where the slope is maximum. This selection is accomplished by the switching circuit discussed in the preceding paragraph, and can be accomplished in the circuit by first subtracting the non-oscillating direct current portion of each signal so that both signals range from $+S_0$ to $-S_0$. The two signals are then sent through an absolute value amplifier. The two absolute value signals are presented to a comparator. The comparator output is used to control a switch that selects the either S1 or S2 depending on which of the two is in the quasi-linear region i.e. the signal with the smallest absolute value. It is important to note that there is no switching between the S1 and S2 signals due to the pressure variations that are being monitored because the time scale of the dynamic pressure changes is much faster than the operation of the comparator and switches.

In all embodiments, the circuit board can be configured to mount input fibers to transmit the light from source 22 and also to mount movable cross-correlator(s) (systems 20a, 20b, 20d) or fixed (system 20c) optical cross-correlators 30a, 30b in front of the detectors $D_1$ and $D_2$.

All embodiments also contemplate that the optical power delivered to detectors $D_1$ and $D_2$ consists of a term that varies quasi-sinusoidally with changes in the sensor gap plus a constant DC offset term. Dynamic changes in the sensor gap result in modulation of the detector(s) signal $S_1$ (and/or $S_2$) that must be scaled to produce a specific output from the processor. Using the example illustrated in FIGS. 2a and 2b above with respect to pressure variations, the output may range over ±5 volts as the sensor gap varies with ±3 psi dynamic pressure change. In order to convert pressure pulsations to a final output in volts, the following steps may be used:

1) pressure pulsations change the sensor gap G which, for the reasons discussed above, results in a corresponding change to the power P incident on whichever detector ($D_1$ or $D_2$) is then in use;
2) the incident signal power generated by the detector is converted to a signal current, where the current is proportional to the power;
3) the signal current is converted to a voltage by a transimpedance amplifier; and
4) the voltage must then go through several stages of amplification to produce the desired final output.

In some cases, to get the desired volt output (e.g., ±5 volts as above), additional gain must be provided and to deal with the variability in the signal level. Such adjustability in the circuit gain can be achieved through the use of a variable resistor or other similar means.

Figure 5A:
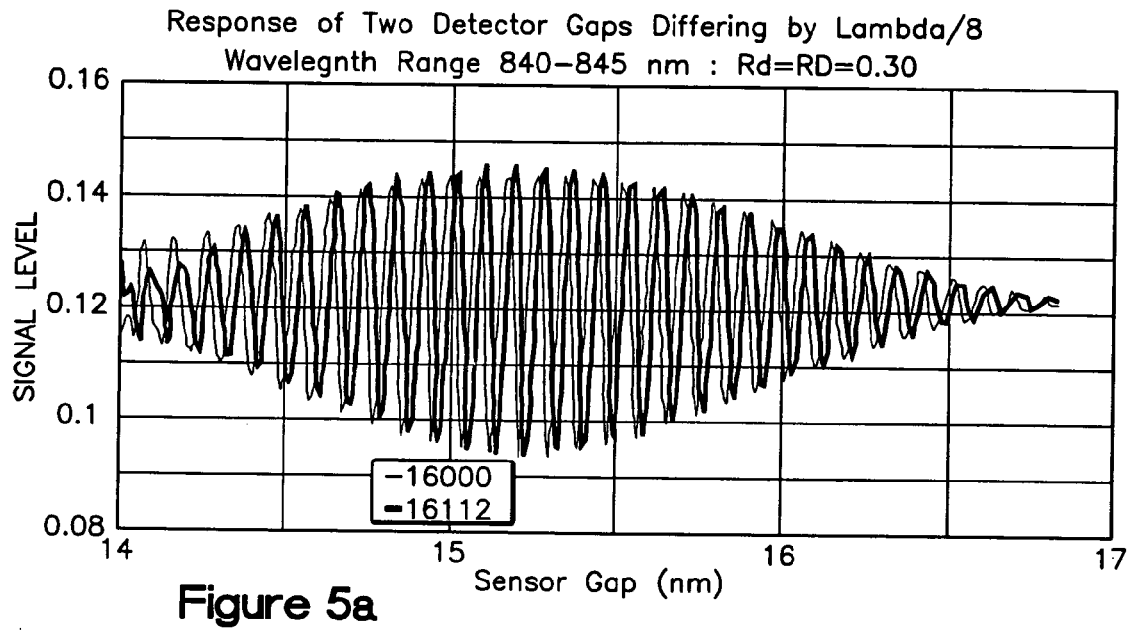
FIG. 5 shows an overview of the signal from the two detectors for a Fabry-Perot sensor gap that ranges from 12 to 24 μm with optical cross-correlators that have gaps that are different by $\lambda/8$ with a light source with a center wavelength 850 nm and spectral width of 50 nm according to the present invention.

The resolution of the signal (i.e., the smallest measurable change in the slope of the curve in FIG. 5a) is not only a function of the signal to noise ratio (with greater resolution possible when that ratio is large), but the resolution also depends on the electrical bandwidth of the circuit comprising signal processor—in a typical system, the higher the bandwidth, the greater is the noise. For optimum performance, the circuit of processor must be designed for the bandwidth required for the specific application, although it is conceivable for a single design the bandwidth might be adjusted with a few components to cover a range of applications (e.g., both 10 kHz and 100 kHz applications). However, a one-size fits all approach compromises the performance at any specific bandwidth. The optimum approach is two or more separate circuit designs for each frequency response band of interest, with the individual circuits being designed in a manner consistent with that described above.

Significantly, dynamically switching between two "pseudo-quadrature" signals does not work using the present invention because switching changes the sign of the signal (+ to −, − to +) and essentially doubles the frequency of the signal, which is a major spurious signal error in the output. Similarly, switching between the two signals on a static basis (time constant≧1 second) provides a useable signal as the static gap of the sensor varies with temperature, but the displacement range of the dynamic signal must be limited to between ±30 nm and ±70 nm depending on the magnitude of the acceptable errors.

The maximum frequency response achievable is determined in part by the amount of power delivered to the detectors, although electrical bandwidth and a variety of other factors of lesser importance also play a role in this determination. Thus, system 20 is basically an analog approach (i.e. dependent upon the intensity of the light signal), and the reference light intensity must be maintained constant so that automatic gain control (AGC) of the LED output power must be used. If such control is not in place, the system 20 may be subject to error due to changes in light source intensity variations and transmission losses throughout the optoelectronic circuit.

The light from source 22 is split and transmitted via optical fibers to a Fabry-Perot sensor 24, with some attendant loss of power, after which some of the light is reflected back through the fibers to detectors $D_1$ and $D_2$. Consequently, a compensation scheme for AGC (automatic gain control) must be incorporated into the system 20. Assuming the light splitting to the detectors is 100% consistent and performed with a 2×2 coupler rather than a 1×2 coupler, then the fourth leg of the coupler (not shown) can terminate at a reference detector, and the signal from the reference detector used to monitor and control the output of the light source 20. Additionally, high frequency noise from power supplies can also be eliminated through the provision of electronic noise filters.

The Fabry-Perot sensor gap may drift around uncontrollably as a result of thermal expansion effects and changes in static DC pressure. If the gap drifts out of range (16±2 μm in the example shown in FIG. 5), the output signal of system 20 becomes too small (or even reaches zero) such that the system is no longer capable of accurately monitoring dynamic changes (oscillations) in the gap. For example, when the system 20 must operate in a high temperature environment, it is sometimes difficult to predict what the operating temperature of the Fabry-Perot sensor gap is, especially if the operating temperature varies over a wide range. If the Fabry-Perot sensor gap is too large or too small, the Fabry-Perot sensor gap does not match the sensitive range of the system 20 shown in the upper curve in FIG. 5a. Thus, to minimize the effects of this mismatch, it is desirable to match the sensor gap with the thickness of the optical cross-correlators used with the detectors in the system through the use of an automated or controllable tuning scheme as described in the embodiments shown in FIGS. 3a, 3b, and 3d.

Figure 5B:
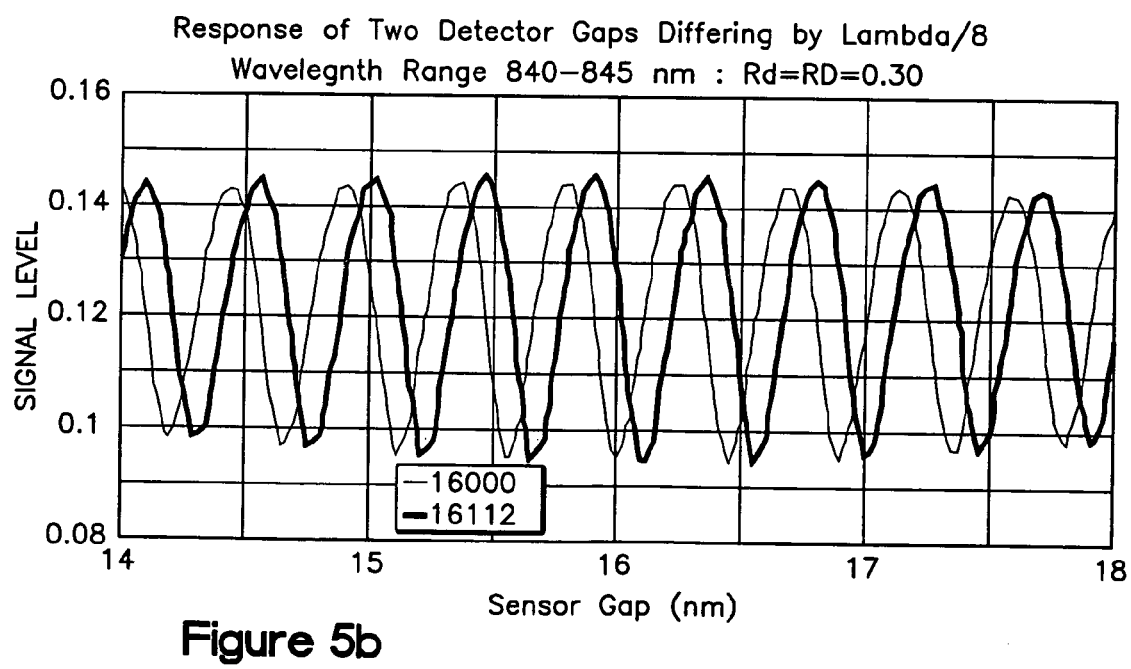
Figure 6:
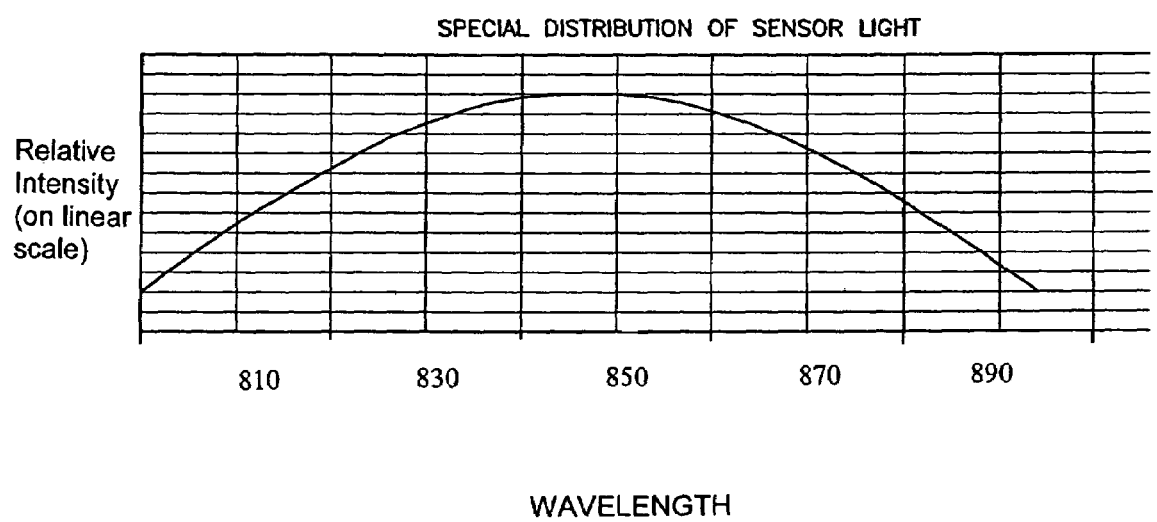
FIG. 6 provides information on the spectral distribution of the light source for the embodiment depicted in FIG. 5.

The correlation pattern shown in FIG. 5a differs significantly from the pattern obtained using white light systems (e.g. systems using a tungsten lamp with a spectral bandwidth exceeding 400 nm) because of the relatively small wavelength band covered by the light source 22. In particular, FIG. 5a shows a wavelength band from only 825 to 875 nm, while FIG. 5b provides further information on the spectral distribution of that light. In order to minimize the error in the measurement of dynamic displacements with a wide band light source, the optical cross-correlator must be tuned to the same length of gap as in the Fabry-Perot sensor. This is because the broadband cross-correlation pattern has only one dominant peak. Narrow band light sources such as lasers provide a cross-correlation pattern that has many peaks that have essentially identical intensity. Consequently, a narrow band light source is desirable because it can be used to interrogate a large range of gaps in Fabry-Perot sensor thus making the construction less sensitive to thermal and other environmental effects and setting the initial gap during the fabrication of the sensor much less critical.

The length of the variable gap optical cross-correlators 30a, 30b is set to equal the length of the Fabry-Perot sensor gap so that the modulated signal shown in FIG. 2b is centered about the Fabry-Perot sensor gap. The variable gap optical cross-correlators 30a, 30b (also referred to above as optical cross correlators each having an adjustable beam-path distance for light modulated by and received from the Fabry-Perot sensor 24) can be mounted in a frame and locked into position relative to each other. A bearing assembly can support the frame, which is attached to the means for moving the optical cross-correlators 31. The frame and optical cross-correlators 30a, 30b are free to move back and forth in a horizontal plane. Notably, individual motors or PZTs can be also associated with each variable gap optical cross-correlator, instead of fixing the optical cross-correlators to a frame, as this arrangement allows for an even wider range of tuning options.

Sensor 24, splitters 26, 28, signal processor and detectors $D_1$ and $D_2$ used in FIGS. 3a, 3b and 3d for tunable systems should be similar to the elements described for non-tunable system in FIG. 3c. Nevertheless, to the extent that the frame is moved in response to the detected signal output, the means for positioning 31 the variable gap optical cross-correlators should also be operatively associated with the signal processing means. The speed of calculations necessary for signal processing in this scheme make a microprocessor or computer a more suitable choice as a processor, especially to the extent that other software may be required to control the various motor(s), actuators or PZT(s) required in the means for moving 31.

The tunable systems using two separate optical cross-correlator/detector arrangements have two basic operational modes: fixed gap and variable gap. When the signal conditioner is tuned to a specific Fabry-Perot sensor that is not subject to variations of temperature or pressure, the optical cross-correlator can be positioned at the optimum position and locked into place (the "fixed gap" setting). The system then operates in a manner similar to the non-tunable system 20 however it has the advantage of the digital signal processing.

With respect to the variable gap mode of operation, the optical cross-correlator can be continuously positioned at the optimum position for a Fabry-Perot sensor that is subject to variations of temperature or pressure. This approach improves the linearity, dynamic range, and overall system accuracy and is most appropriate when the environment of the sensor is not stable.

The tunable systems require software to control the length of the gap of the variable gap optical cross-correlators. This software can be written in any number of ways so long as it includes the two major modes of operation for the invention: initialization and tracking.

During initialization, the variable gap optical cross-correlator is positioned through its entire range of gaps. To filter out electronic noise, multiple A/D reads are made at each incremental position and the average value is recorded. After the initialization scan is completed, the software analyzes the data to determine the position where the length of the gap in the variable gap optical cross-correlator matches the Fabry-Perot sensor gap and directs the system to that position. Periodically the system returns to the initialization mode to assure that the variable gap optical cross-correlator is properly positioned. During the initialization, it may be appropriate to turn off the output of the system to assure that false output signals are not reported to higher tier monitoring systems.

In the tracking mode, the system continually positions the variable gap optical cross correlation interferometers to the optimal position and thereby tracks or measures the length of the Fabry-Perot sensor gap G. For example, if the pressure increases, gap G decreases and the position of optical cross-correlators must be moved to reduce the length of the variable gap in the optical cross-correlator. Tracking may be accomplished by application of a constant dither to the optical cross-correlator position to move it back and forth and to monitor the signals from each detector relative to one another or via use of a CCD without the need for dither.

While the software requirements of the tunable system require a microprocessor, CPU or other similar computing means to gain the desired control of the scanning functions, this added cost is justified by numerous advantages the system possesses in comparison to non-tunable system 20. The tunable version can operate with visible and/or near IR broad band light; with silicon and/or InGaAs detectors; with or without focusing lenses; with a variety of means for continuously variable tuning with a variety of variable gap optical cross-correlators positioned by a variety of positioners such as stepper motors, PZT and magnetostrictive actuators, and the like; and with one or two variable gap optical cross-correlators. Compared with the systems that are configured with fixed gap optical cross-correlators, the tunable configurations can operate with less precisely manufactured Fabry-Perot sensors and can operate over a much wider range of operating conditions.

Figure 11:
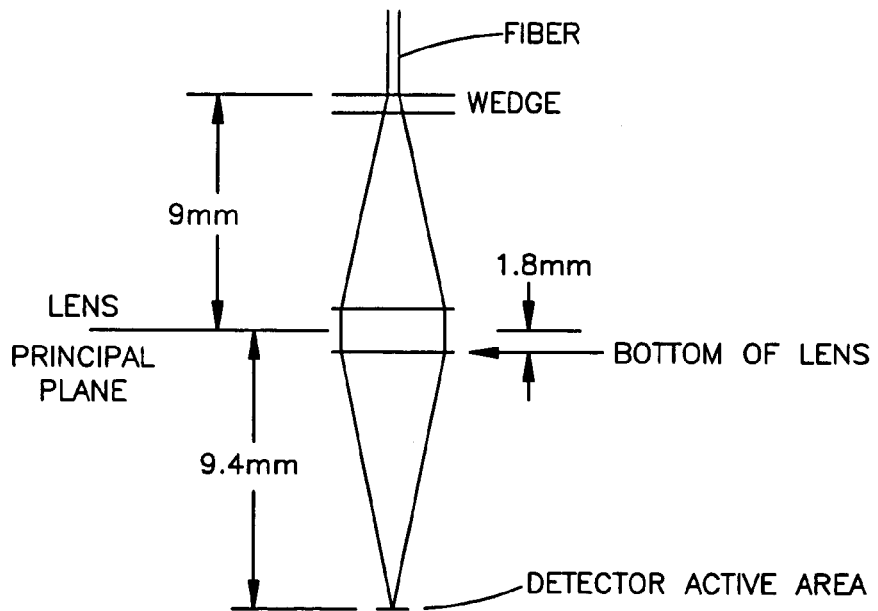
FIG. 11 shows one way in which lenses can be used to improve the collected light power of the present invention.

Although lenses are not required in any of the tunable or fixed systems, lenses may used to minimize the light losses, especially in the event that InGaAs detectors are employed. Such configurations may be incorporated into any of the embodiments described above. For such focusing applications, at least one lens is selected and positioned so that all of the light passing through the optical cross-correlators (for example, optical cross-correlators 30*a*, 30*b* in FIG. 3*a*) is focused onto detectors that have a smaller area than those used in the preferred embodiment. See FIG. 11. Smaller detectors are sometimes desirable because they can respond to higher frequency signals than larger area detectors. More of the light can be captured on small detectors in systems configured with lenses than in systems configured without lenses. Fiber optic sensor signal processing at frequencies beyond 10 kHz require more source power than is available from an LED in a system with or without lenses. Specifically, to readout in the 100 kHz to 10 MHz range, lasers are the only viable light source with sufficient power. Lenses can help to improve the overall system performance especially when high frequency response is required.

Quantitative analysis demonstrates the modulated light signal is relatively unaffected when the projected spot size on the optical cross-correlator covers a range of gaps up to 100 nm. Using this as a criterion, the spot size f at the optical cross-correlator can be expressed as:

$$f < 100 \text{ nm}(\tau)/[600 \text{ nm}(\tau)/\text{mm}(l)] \approx 0.167 \text{ mm}$$

where τ signifies Fizeau wedge thickness change and l signifies optical cross-correlator length change).

With an NA=0.22 and fiber core diameter=0.05 mm, the optimal separation between the fiber and optical cross-correlator can be calculated as less than 0.27 mm. If for any reason, the fiber must standoff more than 0.27 mm from the optical cross-correlator for the given Fizeau wedge configuration, then a lens is needed to assure the projected spot covers a range of gaps less than 100 nm. For steeper Fizeau wedge slopes the standoff must be less and for shallower Fizeau wedge slopes a greater standoff is acceptable. For other variable gap optical cross-correlators such as the PZT-reflector combination described above, the spot size and standoff distance is not an issue. If for any reason a greater standoff is required in the physical apparatus, then a configuration employing the use of lenses such as an aspheric lens with a focal length of 4.6 mm and a clear aperture of 4 mm can be used to capture all the light to focus to a small enough spot size on the specified Fizeau wedge. This detailed example is provided for illustrative purposes only, and it is anticipated that one skilled in the art could use these teachings to appropriately incorporate one or more lenses as needed to enhance the overall performance of the system.

Although lasers can improve system performance, especially frequency response, not all lasers are suitable because, for highly coherent lasers, the modulated light signal fades when laser light interference patterns are reflected from the two surfaces of the Fabry-Perot sensor gap. If the separation of the reflective surfaces at the sensor gap changes slowly with temperature, the interference signal is free to drift anywhere between the maximum and minimum values which may lie beyond the sensitivity range of the system. Specifically, whenever the reflected light signal from the sensor gap passes through regions where the sensitivity goes to zero, this phenomena is referred to as signal fading. To measure changes in the MHz frequency range, it is desirable to maintain the reflected light signal midway between the maximum and zero minimum value where the slope is a maximum. If a laser is substituted as the light source in system 20*a*, 20*b*, 20*c* or 20*d*, without making other compensating changes in the design, there is no "pseudo-quadrature" output unless the length of the gap in the Fabry-Perot sensor exceeds the coherence length of the laser.

Accordingly, still another embodiment of this invention defines an apparatus and method to produce "pseudo-quadrature" signals to make absolute measurements of the length of Fabry-Perot sensor gaps under static and dynamic conditions using a laser light source. The high frequency (or laser-based system) relies on a finite wavelength band (spectral width), $\Delta\lambda$, for the source because if $\Delta\lambda$ is very narrow the correlation patterns are no longer out of phase as described above.

The coherence length is a measure of the path length difference between two beams from the same light source that can produce interference fringes when the beams are combined. In order to have interference fringes there must be a fixed phase relationship between the two beams. If the difference in path length is too long (longer than the coherence length) light from one beam is emitted by the source at a time different enough from the other beam that the phase relationship between the two beams is lost. In other words, the phases of the two beams are uncorrelated and no fringe pattern is formed. The coherence length is inversely proportional to the wavelength band (spectral width) $\Delta\lambda$. A HeNe laser with $\Delta\lambda < 1$ pm has a coherence length of several meters whereas the coherence length of an LED with $\Delta\lambda = 50$ nm is on the order of 10 µm.

Under conditions where the length of the gap in the Fabry-Perot sensor and in the optical cross-correlator exceed the coherence length of the laser, correlation patterns can be generated. Further, "pseudo-quadrature" signals can be produced when two optical cross-correlators are positioned as above with a difference in the length of the gaps of approximately $\lambda/x$, where x is greater than 4 and most preferably 9 for this particular configuration. See FIGS. 7a and 7b for an illustration of this concept.

Semiconductor lasers with power output near 100 mW would be ideal for the light source if these lasers also had a spectral width of 2 to 3 nm. Such lasers are not presently available but a suitable compromise is a 1 mW VCSEL that can be used because it has a wider bandwidth (0.85 nm) than many other lasers which have bandwidths much less than 1 nm.

Several difficulties arise when Fabry-Perot sensors where the length of the gap exceeds 50 µm. In multimode optical fiber, the light path through the optical fiber is mode dependent and the gap G is not well defined because of the angular divergence of the light rays exiting the fiber. The longer the sensor gap, the worse the problem, since higher order modes at steeper angles travel longer distances than lower order modes with angles near the optical axis. The net result of long gaps using multimode fiber is to reduce the signal-to-noise ratio. Two approaches to solve the problem are discussed below.

Figure 8:
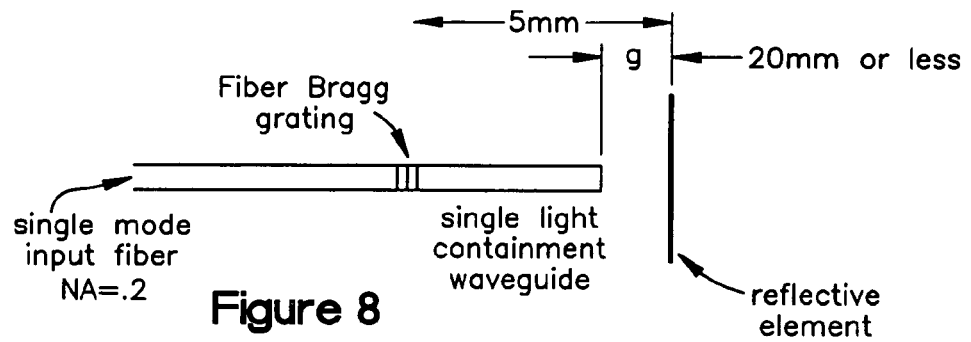
FIG. 8 shows a first embodiment of the Fabry-Perot sensor configuration using single mode optical fiber and a laser light source according to the present invention.

In the first approach, single mode fiber rather than multimode fiber is used throughout the system. A fiber Bragg grating embedded in the optical fiber is used as one of the sensor reflectors. The manufacture of fiber Bragg gratings in single mode fiber is well known in the art. The reflection bandwidth of the fiber Bragg grating can be held to a tolerance of several nanometers, and can be matched to wide bandwidth lasers such as VCSELs, which have a bandwidth of approx. 0.85 nm. The effective gap as shown in FIG. 8 is 5 mm, but the gap, g, between the end of the single mode fiber and reflective element must be held to 20 µm or less to minimize light loss back into the single mode fiber.

Figure 9:
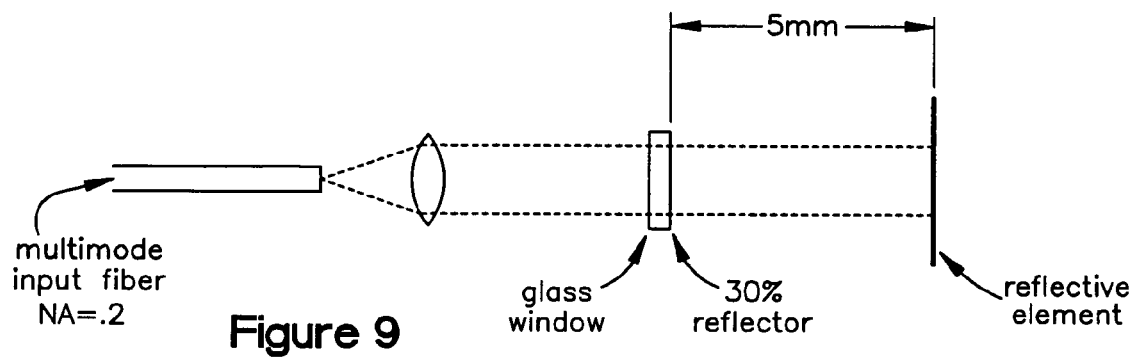
FIG. 9 shows a second embodiment of the Fabry-Perot sensor configuration using multimode optical fiber, a ball lens, and a laser light source according to the present invention.

The second approach illustrated in FIG. 9 uses a ball lens to collimate light from a either a single mode or multimode fiber. The Fabry-Perot sensor gap is defined by parallel reflectors on a glass plate with a 30% reflective coating and reflective element, e.g. pressure diaphragm spaced 1 mm away.

Figure 10:
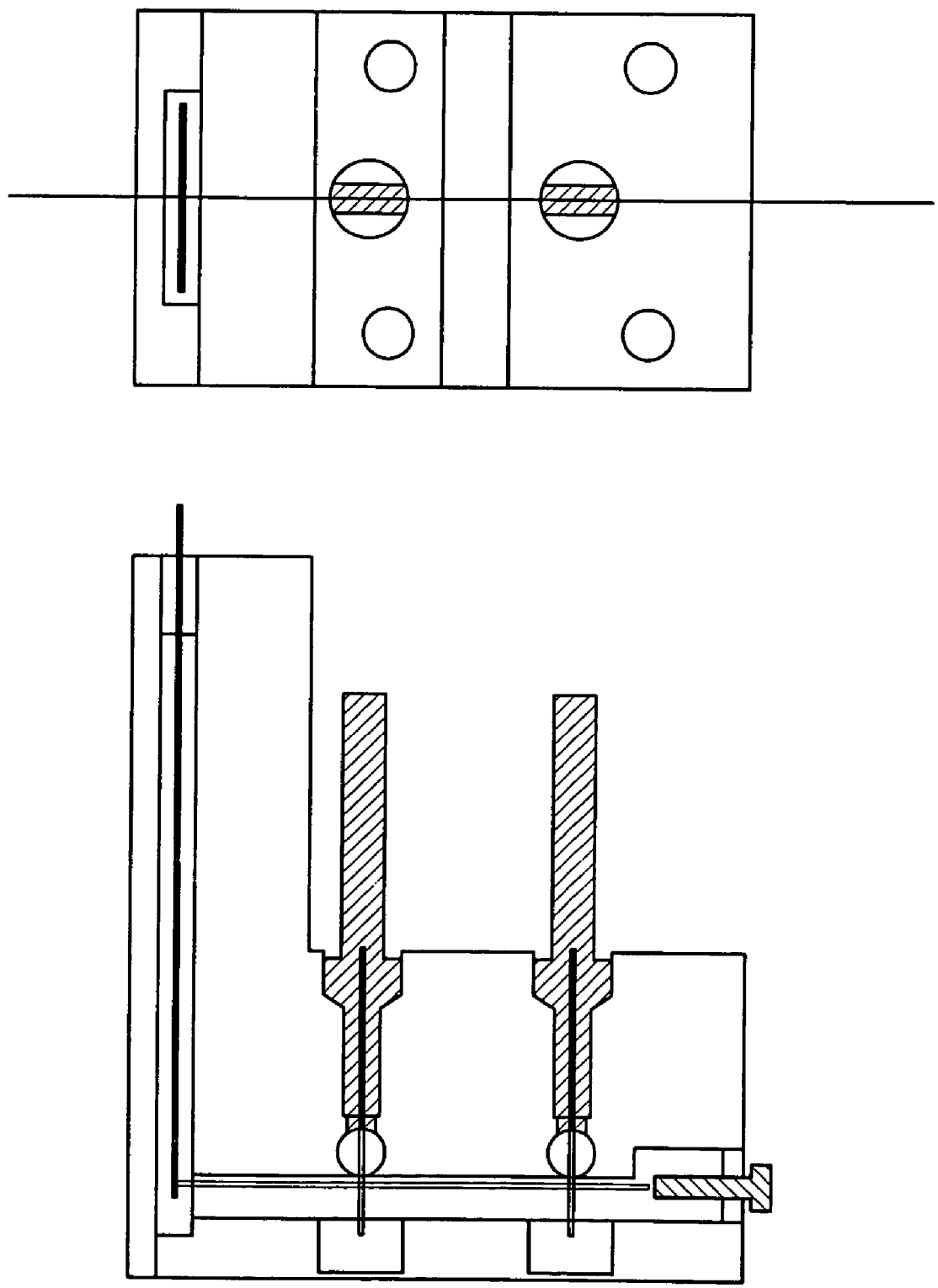
FIG. 10 shows another embodiment for positioning the Fizeau wedge optical cross-correlator of the present invention.

As with the long gap sensor, thick wedge optical cross-correlators must be produced so that the wedge thickness can be matched to the sensor thickness. Divergence angle restrictions similar to those with the long gap Fabry-Perot sensor place practical limitations on the thickness of the optical cross-correlator and therefore the length of the Fabry-Perot sensor gap. While it is possible to manufacture Fabry-Perot sensors with gaps exceeding 5 mm, analysis of the divergence angle effects on the variable gap optical cross-correlator has shown that 1 mm is the preferred range insofar as it balances between the requirements driven by the laser coherence length and the divergence angle. The drawing in FIG. 10 illustrates how two ball lenses can be arranged with a PZT bender, two thick wedge optical cross-correlators, and either a CCD and one photodiode detector or two photodiode detectors to produce the characteristic pseudo-quadrature" signals (see FIG. 2b) from a long gap Fabry-Perot sensor. The "pseudo-quadrature" signals are analyzed in the signal processor to obtain the Fabry-Perot sensor gap as discussed above.

Figure 7A:
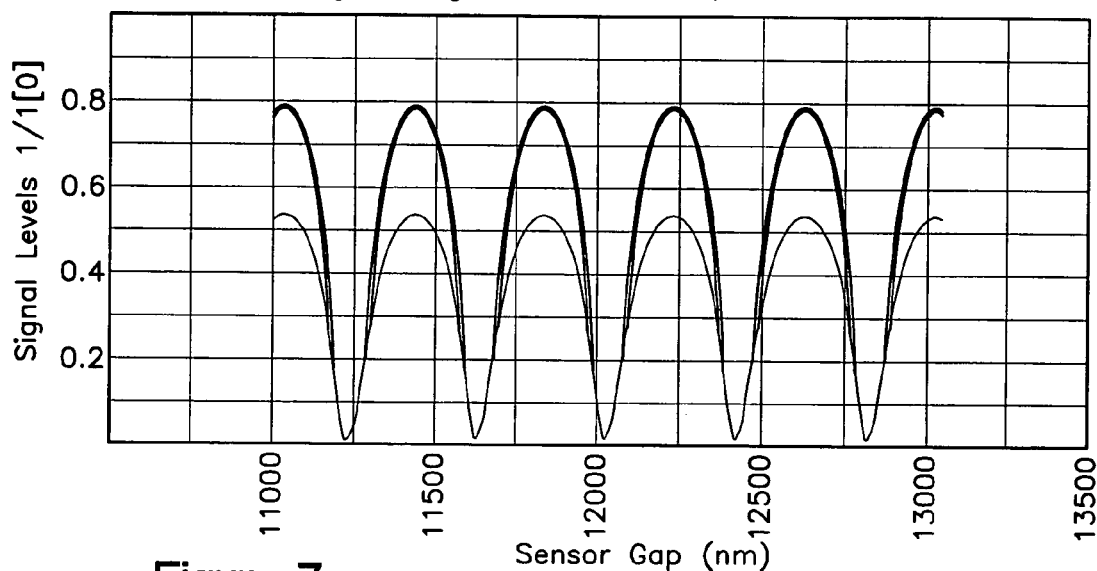
FIGS. 7a and 7b show plots of the response of two Fabry-Perot sensor gaps, one approximately 12,000 nm and the other approximately 150,000 nm where the sensor gap varies +/−1500 nm where the light source is a laser with a bandwidth of 0.85 nm with a center wavelength of 850 nm according to the present invention.
Figure 7B:
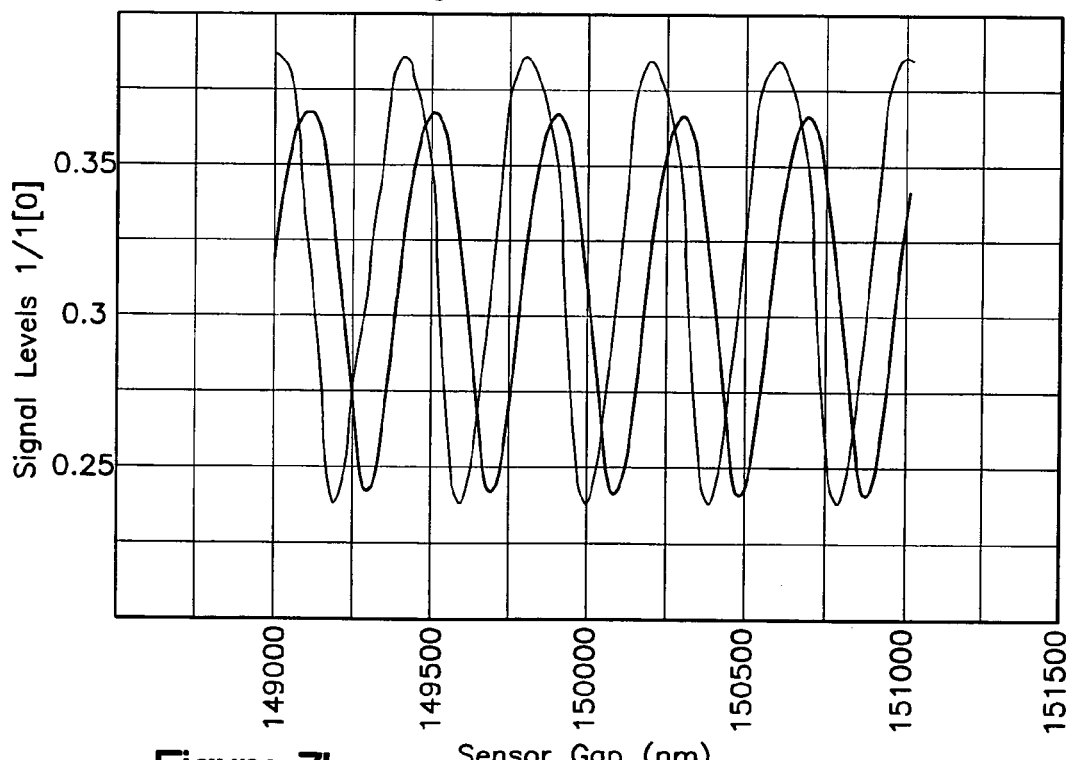

FIGS. 7a and 7b show the results for the 0.85 nm spectral width light source centered at 850 nm such as would be produced by a VCSEL laser. When the Fabry-Perot sensor gap and optical cross-correlator gap are 12 µm, FIG. 7a shows that the signals from the detectors are in phase rather than in "pseudo-quadrature" and as a result it is not possible to determine the magnitude of the sensor gap. FIG. 7b shows that when the Fabry-Perot sensor gap and optical cross-correlator gaps are 1,000,000 nm, (1 mm) "pseudo-quadrature" signals are obtained and the Fabry-Perot sensor gap can be measured. The result is very like that of FIG. 2b because at $\Delta\lambda = 0.85$ nm, the coherence length is shorter than the gap. Similar manipulation of the correlation gap (i.e., the gap between the detector $D_1$ or $D_2$ and the optical cross-correlator 30a, 30b) and the sensor gap G can produce the necessary "pseudo-quadrature" signals at other distances so that processing MHz signal speeds using a high power laser source becomes possible. Ultimately, it is believed that any laser with a bandwidth exceeding 0.5 nm should be acceptable for any of the inventive systems contemplated herein. Correspondingly, at 0.5 nm bandwidths, sensor gaps and/or the beam-path distance(s) of the optical cross-correlator(s) should exceed 500 µm.

There are numerous advantages to using a laser-based system. The first deals with the relative range of Fabry-Perot sensor gaps over which interference fringes are visible. With the laser, a significantly greater range of Fabry-Perot sensor gaps can be measured than with system 20a, 20b, 20c or 20d configured with wider bandwidth light sources. This larger range of gaps means that no motor is required for macroscopic positioning of Fizeau wedge optical cross-correlators. Instead, a PZT can be used to make small adjustments within a fraction of a wavelength to maintain the measured signal on the slope of an interference fringe or a CCD array can be used with software to identify the midpoint on the slope of a fringe (although the PZT approach is preferred for high frequency response). Secondly, since a laser source is used, operation over a long distance range is possible because a high power laser source overcomes the cumulative light loss over long distance transmission in optical fibers.

Using the methods above, laser-based systems can be created for Fabry-Perot sensor gaps with lengths of approximately one millimeter without departing from the principles of this alternate embodiment. Additionally, the laser system may be incorporated into any of the variations embraced by either the tunable or non-tunable systems described above, just as the various other alternative embodiments may be selectively paired together to create any number of systems. Other variations for this and the other embodiments contemplated above will also be apparent to those skilled in the art, and such variations are expressly considered to be embraced by this specification and the foregoing claims.

We claim:

1. An apparatus for measuring a length of an unknown gap, said unknown gap being in a static or dynamic state, the apparatus comprising:
   a light source;
   a Fabry-Perot sensor spanning a gap length, said Fabry-Perot sensor modulating light from the light source;
   means for optically cross-correlating the modulated light;
   detector means for generating signals from the cross-correlated light wherein the means for optically cross-correlating the modulated light is dynamically positionable relative to the detector means during operation in response to a previously generated signal;
   processor means for producing an output indicative of the gap length based upon signals generated by the detector means; and
   means for optically connecting the light source, the Fabry-Perot sensor, the means for cross-correlating and the detector means.

2. An apparatus according to claim 1 wherein the means for cross-correlating includes at least one interferometer, said interferometer selected from the group consisting of: a Fabry-Perot interferometer and a Fizeau wedge interferometer.

3. An apparatus according to claim 1 wherein the detector means includes at least one selected from the group consisting of: a charged coupled device array and a photodiode.

4. An apparatus according to claim 1 wherein the means for optically connecting is selected from the group consisting of: single mode fiber and multimode fiber.

5. An apparatus according to claim 1 wherein the means for optically cross-correlating includes at least one selected from the group consisting of: a focusing lens, a PZT element, a stepper motor, a linear actuator, a rotary actuator, a magnetostrictive actuator and a lever arm.

6. An apparatus according to claim 5 wherein said means for cross-correlating receives a first beam of modulated light along a first beam-path distance and receives a second beam of modulated light along a second beam-path distance, said first beam-path distance not being equal to the second beam-path distance.

7. The apparatus according to claim 5 wherein the light source concurrently provides light at a first central wavelength and a second central wavelength, said first central wavelength not being equal to said second central wavelength.

8. An apparatus according to claim 7 wherein the detector means includes a first element capable of producing signals based on light of the first central wavelength and a second element capable of producing signals based on light of the second central wavelength.

9. An apparatus according to claim 1 wherein the modulated light has a center wavelength $\lambda$ and wherein the first beam differs from the second beam by a distance of $\lambda/x$ and $x>4$.

10. An apparatus according to claim 1 wherein the means for cross-correlating receives the modulated light along a beam-path distance, said beam-path distance being varied so as to cause the detector means to produce two distinct signals.

11. An apparatus according to claim 10 wherein the processor means includes controls for an initialization mode and a tracking mode.

12. An apparatus according to claim 1 wherein the light source comprises a laser having a bandwidth exceeding 0.5 nm.

13. An apparatus according to claim 12 wherein the laser light source is selected from the group consisting of: a wideband laser and a VCSEL.

14. An apparatus according to claim 12 wherein said means for cross-correlating receives a first beam of modulated light along a first beam-path distance and receives a second beam of modulated light along a second beam-path distance, said first beam-path distance not being equal to the second beam-path distance.

15. An apparatus according to claim 12 wherein the means for cross-correlating receives the modulated light along a beam-path distance, said beam-path distance being varied so as to cause the detector means to produce two distinct signals.

16. An apparatus according to claim 1 wherein said light source is a single light source.

17. An apparatus for measuring the length of an unknown gap, said unknown gap being in a static or dynamic state, the apparatus comprising:
   a light source;
   a Fabry-Perot sensor spanning a gap length, said Fabry-Perot sensor modulating light from the light source;
   means for optically cross-correlating the modulated light;
   detector means for generating first and second signals from the cross-correlated light;
   means for processing the first and second signals to produce an output indicative of the gap length, said means for processing having a switching circuit and a comparator wherein the comparator controls the switching circuit to insure that either the first signal or the second signal is selected for processing to produce the output based on lowest absolute value.

18. The apparatus according to claim 17, wherein the means for processing further comprises a first input divider providing the first signal to the switching circuit and to a first absolute value amplifier and a second input divider providing the second signal to the switching circuit and to a second absolute value amplifier and wherein the first absolute value amplifier is positioned between the first input divider and the comparator and the second absolute value amplifier is positioned between the second input divider and the comparator.

19. An apparatus for measuring a length of an unknown gap, said unknown gap being in a static or dynamic state, the apparatus comprising:
   a light source;
   a Fabry-Perot sensor spanning a gap length, said Fabry-Perot sensor modulating light from the light source;
   a first optical cross-correlator capable of cross-correlating the modulated light;
   a second optical cross-correlator capable of cross-correlating the modulated light, wherein the gap length is measured by fixing the first optical cross-correlator relative to the second optical cross-correlator such that cross-correlated light of the first optical cross-correlator is out of phase with the cross-correlated light of the second optical cross-correlator;
   a detector that generates signals from the cross-correlated light, wherein the first and second optical cross-correlators are dynamically positionable relative to the detector during operation in response to a previously generated signal; and a processor that produces an output indicative of the changes in the gap length based upon signals generated by the detector.

20. An apparatus according to claim 19 wherein changes in the gap length are measured by positioning the optical cross-correlator so one signal is on a steep slope and another signal is near its adjacent peak or valley.

21. An apparatus according to claim 20 wherein the modulated light has a center wavelength $\lambda$ and wherein the first beam differs from the second beam by a distance of $\lambda/x$ and $x>8$.

22. An apparatus according to claim 21 wherein the first and second optical cross-correlators includes at least one of a focusing lens, a PZT element, a stepper motor, a linear actuator, a rotary actuator, a magnetostrictive actuator, and a lever arm, and wherein said detector includes at least one of a charged coupled device array and a photodiode.

23. An apparatus for measuring a length of an unknown gap, said unknown gap being in a static or dynamic state, the apparatus comprising:
  no more than two light sources;
  a Fabry-Perot sensor spanning a gap length, said Fabry-Perot sensor optically connected to the light source and said Fabry-Perot sensor modulating light from the light source;
  an optical cross-correlator optically connected to the Fabry-Perot sensor;
  a detector capable of receiving signals from the cross-correlated light;
  a positioning device operably coupled to the optical cross-correlator, the positioning device capable of dynamically positioning the cross-correlator relative to the detector during operation in response to a previously generated signal; and
  a processor that produces an output indicative of the gap length based upon signals generated by the detector.

24. An apparatus according to claim 23 wherein the modulated light comprises first and second beams with different center wavelengths, the first beam has a center wavelength $\lambda 1$ and the second beam has center wavelength $\lambda 2$, and $\lambda 1$ is detected by a silicon detector and $\lambda 2$ is detected by a InGaAs detector.

25. An apparatus according to claim 24 wherein the positioning device includes at least one selected from the group consisting of: a focusing lens, a PZT element, a stepper motor, a linear actuator, a rotary actuator, a magnetostrictive actuator, and a lever arm.

26. An apparatus according to claim 23 wherein the optical cross-correlator receives a first beam of modulated light along a first beam-path distance and receives a second beam of modulated light along a second beam-path distance, said first beam-path distance not being equal to the second beam-path distance.

* * * * *